July 16, 1940.  K. G. ÖSTBERG  2,207,872
CUTTING TOOL FOR PLATE SHEARS
Filed May 18, 1938
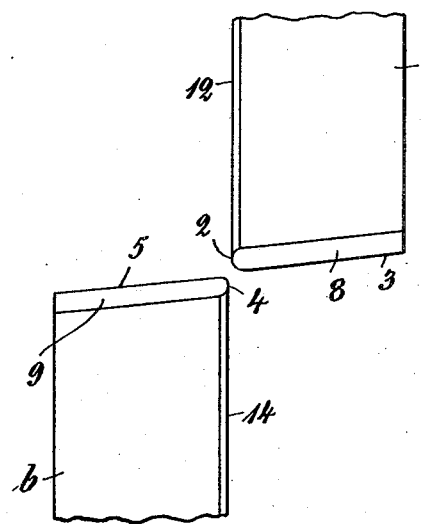
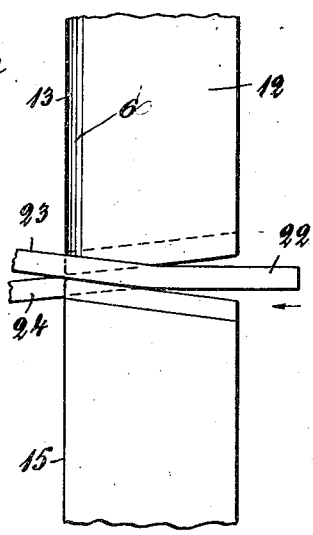
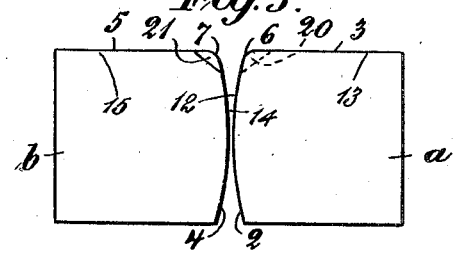
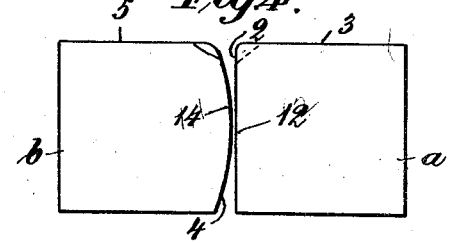
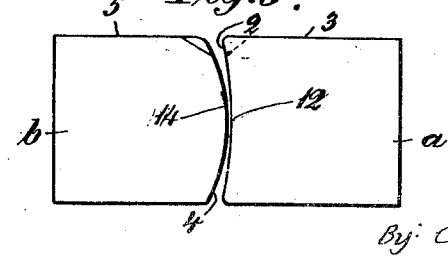
K. G. Östberg
Inventor
By: Glascock Downing & Seebold
Attys Patented July 16, 1940

2,207,872

UNITED STATES PATENT OFFICE 2,207,872

CUTTING TOOL FOR PLATE SHEARS

Karl Gustaf Östberg, Stockholm, Sweden, assignor to Fabriksaktiebolaget Haldataxametern, Halmstad, Sweden, a company of Sweden Application May 18, 1938, Serial No. 208,674
In Sweden May 25, 1937

6 Claims. (Cl. 164—58)

The present invention relates to cutting tools or cutters for plate shears, and it relates more particularly to cutting tools or cutters for plate shears of the kind, in which two rod-shaped substantially parallelepipedic cutting tools are arranged to perform a reciprocating movement with respect to each other in their longitudinal directions and at right angles to the plane in which the plate is fed to the tools. The primary object of the invention is to provide a cutter which renders possible the cutting of plates along curves having a small radius of curvature, a further object being to provide a cutter which while being suitable for said purpose is provided with cutting edges sufficiently strong to withstand the great stresses which are set up when cutting comparatively thick plates of a hard material, for example steel plates of a stainless or non-corroding material.

When cutting comparatively thick plates it has been found that those side surfaces of the cutting tool, which face each other and which form each one side of the cutting edge of the respective tool, will render the cutting along curves more difficult due to the fact that the sheared edges of the plate will be guided for movement in a straight line against said side surfaces along a comparatively great length of the cutting edge. Said inconvenience is avoided according to the invention by such shaping of said side surfaces that the acting portions of the cutting edges will diverge with respect to each other at an acute angle which gradually increases in the direction of feed of the plate to be cut.

The invention will now be described in detail having reference to the drawing attached to this specification and forming part thereof, in which Figure 1 shows two cutting tools shaped according to one embodiment of the invention, the tools being viewed in the direction of feed of the plate and being arranged in the relative positions which they take up in the plate shearing machine;

Figure 2 is a side view and Figure 3 is a plan view of the cutting tools shown in Figure 1;

Figures 4 and 5 are plan views of two other embodiments of cutters according to the invention.

In the shown examples, the two cutters $a$ and $b$ have the same shape and size. They consist of rod-shaped bodies of parallelepipedic shape and having a substantially square cross section. The lower cutter $b$ is preferably rigidly secured in the frame of the machine, whereas the upper cutter $a$ is arranged to perform a reciprocating movement in its longitudinal direction in parallel with the longitudinal direction of the lower cutter. Each cutter is provided along two adjacent edges with two cutting edges 2, 3 or 4, 5 respectively, said cutting edges forming an acute angle, preferably an equal angle, with the longitudinal corner edge 6 or 7 respectively in which they meet. Said longitudinal corner edge 6 or 7 respectively is rounded so as to form a bent corner surface, preferably of cylindrical shape. Each cutter is provided with a plane end surface 8 or 9 respectively forming the same angle of inclination with the two side surfaces in which the cutting edges 2, 3 or 4, 5 respectively are positioned.

The cutters are defined at their ends by an inclined plane 8 and 9 respectively which forms a right angle with a diagonal plane through the corner edge 6 or 7 respectively, cutting edges 2, 3 or 4, 5 respectively having an acute cutting edge angle formed between the plane end surface 8 or 9 respectively and the side surfaces 12, 13 or 14, 15 respectively. In the mutual positions of the cutters shown the cutting edges 2 and 4 are in their operative positions. The longitudinal corner edges 6 or 7 respectively, in which the two cutting edges 2, 3 or 4, 5 meet, are rounded in the manner shown in Figure 3. At the pointed corner the cutters are preferably bevelled so as to provide a surface element 20 or 21 respectively which is perpendicular to the longitudinal direction of the cutter. To facilitate the cutting in curves the two opposing side surfaces 12 and 14 of the respective tools have been given, according to the invention, a cylindrical shape, as is clear from Figure 3, the cutting edges 2 and 4 then assuming a correspondingly bent shape.

When feeding the plate 22 towards the tools in the direction of the arrow in Figure 2, the sheared edges 23, 24 of the plate are displaced in respect to each other through the action of the cutters on the plate, so that during the reciprocating movement of the cutters the sheared edges will partly be positioned laterally of the cutting edges of the cutters. However, thanks to said cylindrical shape of the side surfaces 12, 14 the sheared edges will not contact directly with said side surfaces, in that a clearance is formed between the cutting edges, which clearance along the active half of the edges increases successively in width in the direction of feed of the plate. For this reason the plate can be turned through a certain angle towards one side or the other during the feeding of the plate before the sheared edges of the cut engage with the side surfaces 12 and 14 respectively. In this manner the cutting along curves is considerably facilitated, particularly when cutting thick plates in which the cutting edges are active along a greater part of their length than when cutting thin plates.

By turning the cutters 90° in their holders the cutting edges 3, 5 can be brought into operative positions instead, the plate being fed in the direction towards the rounded corner edges 6, 7. The cutting edges 3, 5, which have plane side surfaces, can preferably be used when cutting thin plates and when cutting plates along straight lines. When the plate is to be cut along a curve which is bent in one direction only, such as when cutting out circular pieces, only one of the two opposing side surfaces 12, 14 need be bent while the other may be plane, as shown in Figure 4; in this case the radius of curvature of the surface 12 can be smaller than in Figure 3 under otherwise equal conditions. By making one surface 12 convex and the other 14 concave, as shown in Figure 5, the radius of curvature of the surface 12 can be reduced further, which in turn renders possible the cutting in curves having a still smaller radius of curvature. The concave surface 14 has then preferably a greater radius of curvature than the convex surface 12.

I claim:

1. A cutting device for power driven shears comprising a pair of rod-shaped cutting tools adapted to perform relatively to each other a reciprocating movement in their longitudinal direction, said cutting tools having converging cutting edges limited on the one hand by inclined transversal end surfaces and on the other hand by the opposing longitudinal side surfaces of the tools, the longitudinal corner edges at the rear ends of the cutting edges being rounded off along a cylindrical surface and one of the opposing side surfaces being curved along a cylindrical surface having an essentially larger radius of curvature than the cylindrical surface of said corner edges.

2. A cutting tool as claimed in claim 1, in which the point of the tool is cut off along a plane extending substantially at right angles to the longitudinal direction of the tool.

3. A pair of cutting tools as claimed in claim 1 in which the opposing side surfaces of the tools are both convex.

4. A pair of cutting tools as claimed in claim 1, in which one of the two opposing side surfaces of the tools is convex and the other plane.

5. A pair of cutting tools as claimed in claim 1, in which one of the two opposing side surfaces is convex and the other concave.

6. A pair of cutting tools as claimed in claim 1, in which one of the two opposing side surfaces is convex and the other concave, the convex surface having a smaller radius of curvature than the concave surface.

KARL GUSTAF ÖSTBERG.